(12) United States Patent
Ota et al.

(10) Patent No.: US 7,695,173 B2
(45) Date of Patent: Apr. 13, 2010

(54) MOTORCYCLE FRONT LIGHTING APPARATUS STRUCTURE

(75) Inventors: Hiroyasu Ota, Saitama (JP); Eiji Ashihara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 31 days.

(21) Appl. No.: 12/056,094

(22) Filed: Mar. 26, 2008

(65) Prior Publication Data
US 2008/0239738 A1  Oct. 2, 2008

(30) Foreign Application Priority Data
Mar. 30, 2007 (JP) ............................. 2007-095425
Oct. 19, 2007 (JP) ............................. 2007-272693

(51) Int. Cl.
*F21V 33/00* (2006.01)
(52) U.S. Cl. ................. 362/475; 362/473; 362/476
(58) Field of Classification Search ................. 362/473, 362/474, 475, 476
See application file for complete search history.

(56) References Cited

U.S. PATENT DOCUMENTS

| 4,206,498 A | * | 6/1980 | Kader | .................. 362/475 |
| 2006/0181891 A1 | * | 8/2006 | Surawichai et al. | ......... 362/474 |
| 2007/0236949 A1 | * | 10/2007 | Kurihara | ..................... 362/475 |

FOREIGN PATENT DOCUMENTS

| DE | 103 42 106 A1 | 3/2004 |
| FR | 2 599 469 A1 | 12/1987 |
| FR | 2 599 496 A1 | 12/1987 |
| FR | 2 624 584 A1 | 6/1989 |
| JP | 2000-57807 A | 2/2000 |
| JP | 2005-324703 A | 11/2005 |
| WO | WO-03/035456 A1 | 5/2003 |

* cited by examiner

*Primary Examiner*—Laura Tso
(74) *Attorney, Agent, or Firm*—Birch, Stewart, Kolasch & Birch, LLP

(57) ABSTRACT

A motorcycle front lighting apparatus structure includes a headlight and a position light provided adjacent to the headlight. In this structure, the position light is disposed in a condition protruding downwardly from a lower edge of the headlight. This structure allows the position light to be made larger, and makes any needed repair easy and cost effective.

15 Claims, 16 Drawing Sheets

MOTORCYCLE FRONT LIGHTING APPARATUS STRUCTURE

CROSS-REFERENCE TO RELATED APPLICATION

The present application claims priority under 35 U.S.C. §119 to Japanese Patent Application No. 2007-095425, filed Mar. 30, 2007, and Japanese Patent Application No. 2007-272693, filed Oct. 19, 2007, the entire contents of which are hereby incorporated by reference.

BACKGROUND OF THE INVENTION

1. Field of the Invention

The present invention relates to a front lighting apparatus structure for a motorcycle, including a headlight and a position light provided according to the headlight.

2. Description of Background Art

A known motorcycle front lighting apparatus structure includes a position light integrated into a case for a headlight (see, for example, Japanese Patent Laid-open No. 2000-57807).

A headlight mounting structure is known, in which a meter unit is mounted on a headlight, the headlight is attached to housing by tightening, and the housing is rotatably supported on a stay of the headlight (see, for example, Japanese Patent Laid-open No. 2005-324703).

In the abovementioned known front lighting apparatus structure disclosed in Japanese Patent Laid-open No. 2000-57807, however, making the position light large for improving indication performance and appearance calls for making the entire headlight case large. This is not desirable from a design viewpoint.

If the headlight fogs or a related problem occurs as a result of water entry in the case because of a defective position light, the position light cannot be replaced with a good one individually. This makes it necessary to replace the entire headlight, requiring a large amount of repair cost.

Further, in the known headlight mounting structure disclosed in Japanese Patent Laid-open No. 2005-324703, the housing needs to be made larger in order to enhance rigidity of the housing (headlight cover) supporting the meter unit and the headlight. Further, a headlight aiming procedure also moves the meter unit mounted in the headlight. This results in the meter unit being moved out of an optimum position for a rider.

SUMMARY AND OBJECTS OF THE INVENTION

The present invention has been made to solve the foregoing problems and it is an object of the present invention to provide a front lighting apparatus structure for a motorcycle, the structure allowing a position light to be made larger easily and being advantageous in terms of cost of repair and the like.

To achieve the foregoing objects, according to a first aspect of the present invention, there is provided a front lighting apparatus structure for a motorcycle including a headlight and a position light, in which the position light is disposed at a lower portion of the headlight and outside a lens of the headlight.

In accordance with a second aspect of the present invention, in addition to the first aspect of the present invention, the front lighting apparatus structure is characterized in that the position light is removably mounted on the headlight.

In accordance with a third aspect of the present invention, in addition to the first aspect of the present invention, the front lighting apparatus structure is characterized in that the position light has an upper portion mounted on a headlight lower cover disposed at the lower portion of the headlight, and a lower portion mounted on a side of the headlight.

In accordance with a fourth aspect of the present invention, in addition to the first aspect of the present invention, the front lighting apparatus structure is characterized in that a meter unit is disposed on an upper portion of the headlight.

EFFECTS OF THE INVENTION INCLUDE THE FOLLOWING

In the front lighting apparatus structure according to the first aspect of the present invention, the position light is disposed at a lower portion of the headlight and outside the lens of the headlight. This allows the position light to be designed separately from the headlight when the position light is to be made larger for improved indication performance and appearance. The position light can therefore be easily made large.

In the front lighting apparatus structure according to the second aspect of the present invention, the position light is removably mounted on the headlight. This allows the position light to be repaired individually, independently of the headlight. This makes the front lighting apparatus structure according to the second aspect of the present invention advantageous in terms of repair cost.

In the front lighting apparatus structure according to the third aspect of the present invention, the position light has the upper portion mounted on the headlight lower cover disposed at the lower portion of the headlight, and the lower portion mounted on the side of the headlight. This allows the headlight and the position light to be compactly assembled together.

In the front lighting apparatus structure according to the fourth aspect of the present invention, the meter unit is disposed on the upper portion of the headlight. As compared with the arrangement, in which the meter unit is mounted via a meter stay on the side of the vehicle body, a heavy-weight part, such as the stay, can be disused to make the mounting structure even simpler and lighter in weight.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
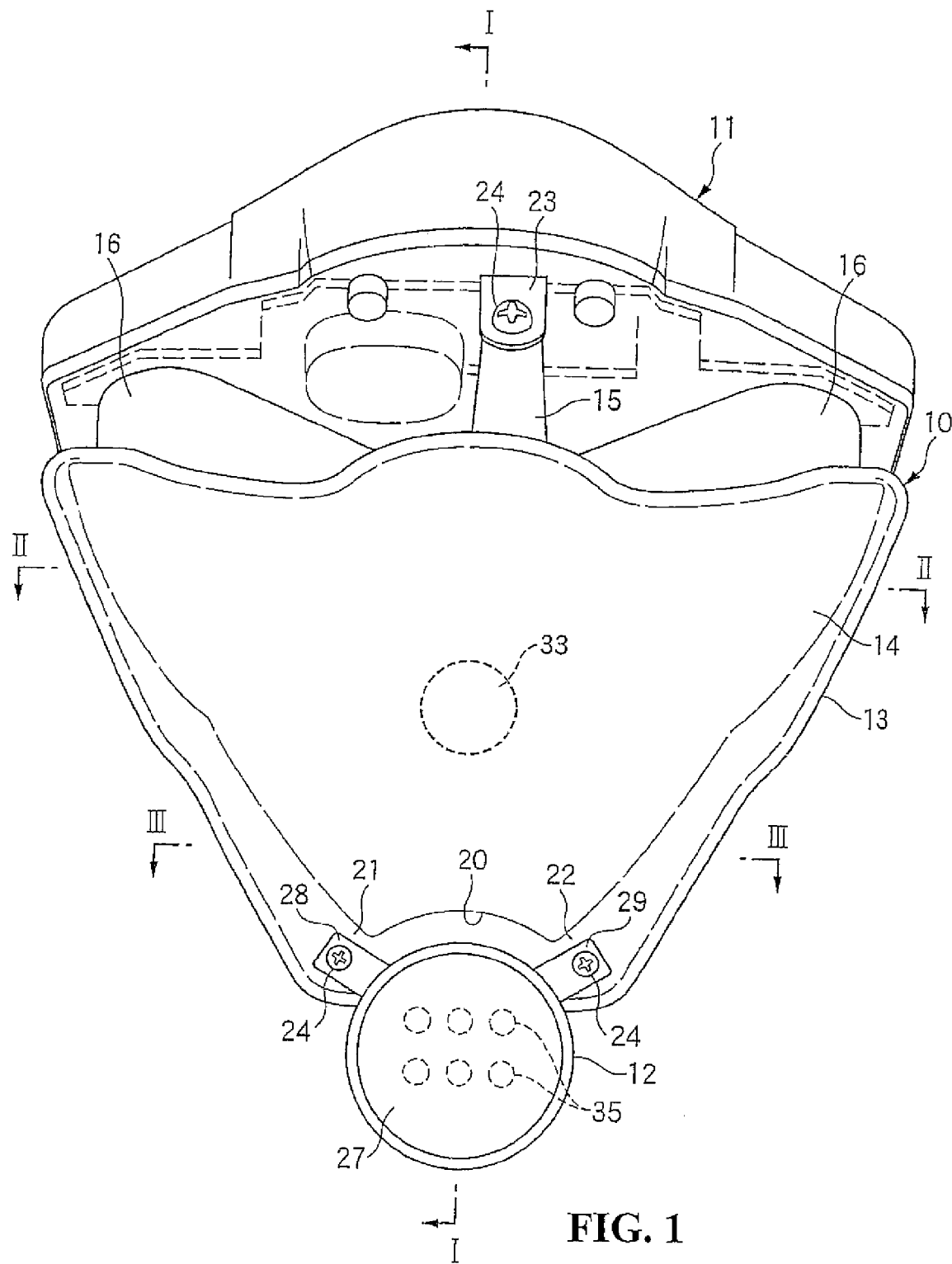
FIG. 1 is a front view for illustrating a front lighting apparatus structure for a motorcycle according to a first embodiment of the present invention, shown through a meter visor.
Figure 2:
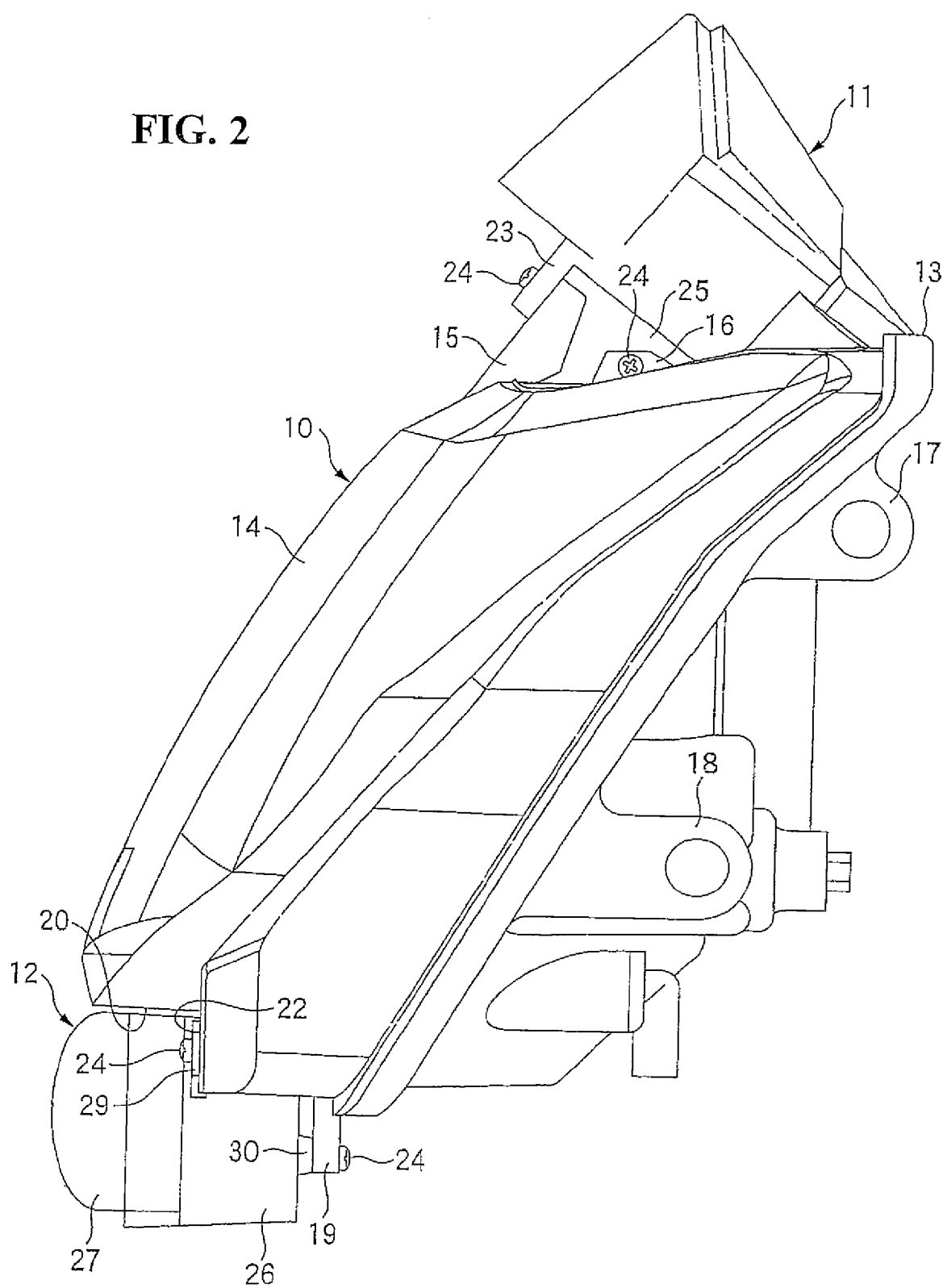
FIG. 2 is a left side elevational view showing the front lighting apparatus structure of FIG. 1.

Referring to FIGS. 1 and 2, the motorcycle front lighting apparatus structure according to a first embodiment of the present invention includes a headlight unit 10, a meter unit 11, and a position light 12.

The headlight unit 10 includes a headlight case 13 formed into a substantially V shape and a transparent headlight lens 14 fitted to a front portion of the headlight case 13.

The headlight case 13 includes a center bracket 15 and a pair of side brackets 16. The center bracket 15 is formed at a center and the side brackets 16 are formed on sides at an upper portion of the headlight case 13. The center bracket 15 and the side brackets 16 are formed in an upwardly protruding condition.

The headlight case 13 further includes a pair of upper brackets 17 and a pair of lower brackets 18. The upper brackets 17 and the lower brackets 18 are formed on the sides of the headlight case 13. In addition, the headlight case 13 includes a rear side position light bracket 19 formed on a lower end of the headlight case 13 in a downwardly protruding condition.

The headlight lens 14 includes a position light recess 20 formed on a lower end edge of the headlight lens 14. The position light recess 20 is upwardly recessed. Portions on both sides of the position light recess 20 form front side position light fixing portions 21, 22.

The meter unit 11 accommodates therein a speedometer, a tachometer, a fuel gauge, and the like not shown. The meter unit 11 includes a center bracket 23 formed on a lower surface thereof in a protruding condition. The center bracket 23 is aligned with the center bracket 15 of the headlight case 13. A screw 24 is then screwed in to secure the center bracket 23 in place. The meter unit 11 further includes a pair of side brackets 25 formed in a protruding condition on sides thereof. The side brackets 25 are aligned with the side brackets 16 of the headlight case 13. A screw 24 is then screwed in to secure the side brackets 25 in place.

The meter unit 11 is directly mounted to an upper portion of the headlight case 13. This arrangement helps make a mounting structure simpler and lighter in weight by disusing a heavy-weight part, such as a stay, as compared with the known meter unit which is mounted on the side of a vehicle body via a stay.

The position light 12 is independent of the headlight unit 10. A transparent position light lens 27 is fitted to a front portion of a position light case 26 mounted externally on the headlight case 13.

The position light case 26 includes a pair of headlight lens fixing brackets 28, 29 formed in a protruding condition on both sides at the front thereof. The position light case 26 further includes a single headlight case fixing boss 30 formed at a center in the rear thereof.

The headlight lens fixing brackets 28, 29 are aligned with the front side position light fixing portions 21, 22 of the position light recess 20, while the headlight case fixing boss 30 is aligned with the rear side position light bracket 19. Then, screws 24 are screwed into the respective positions, so that the position light 12 is secured to the headlight unit 10. It is to be noted herein that the position light 12 can be removed independently of the headlight unit 10 from the headlight lens fixing brackets 28, 29 and the headlight case fixing boss 30 by removing the screws 24.

The position light 12 bulges downwardly from a lower edge of the headlight unit 10. The position light 12 is therefore designed separately from the headlight unit 10 when the position light 12 is to be made larger to improve indication performance and appearance. In addition, the position light 12 is removably mounted independently of the headlight unit 10. This allows the position light 12 to be repaired independently of the headlight unit 10.

Figure 3:
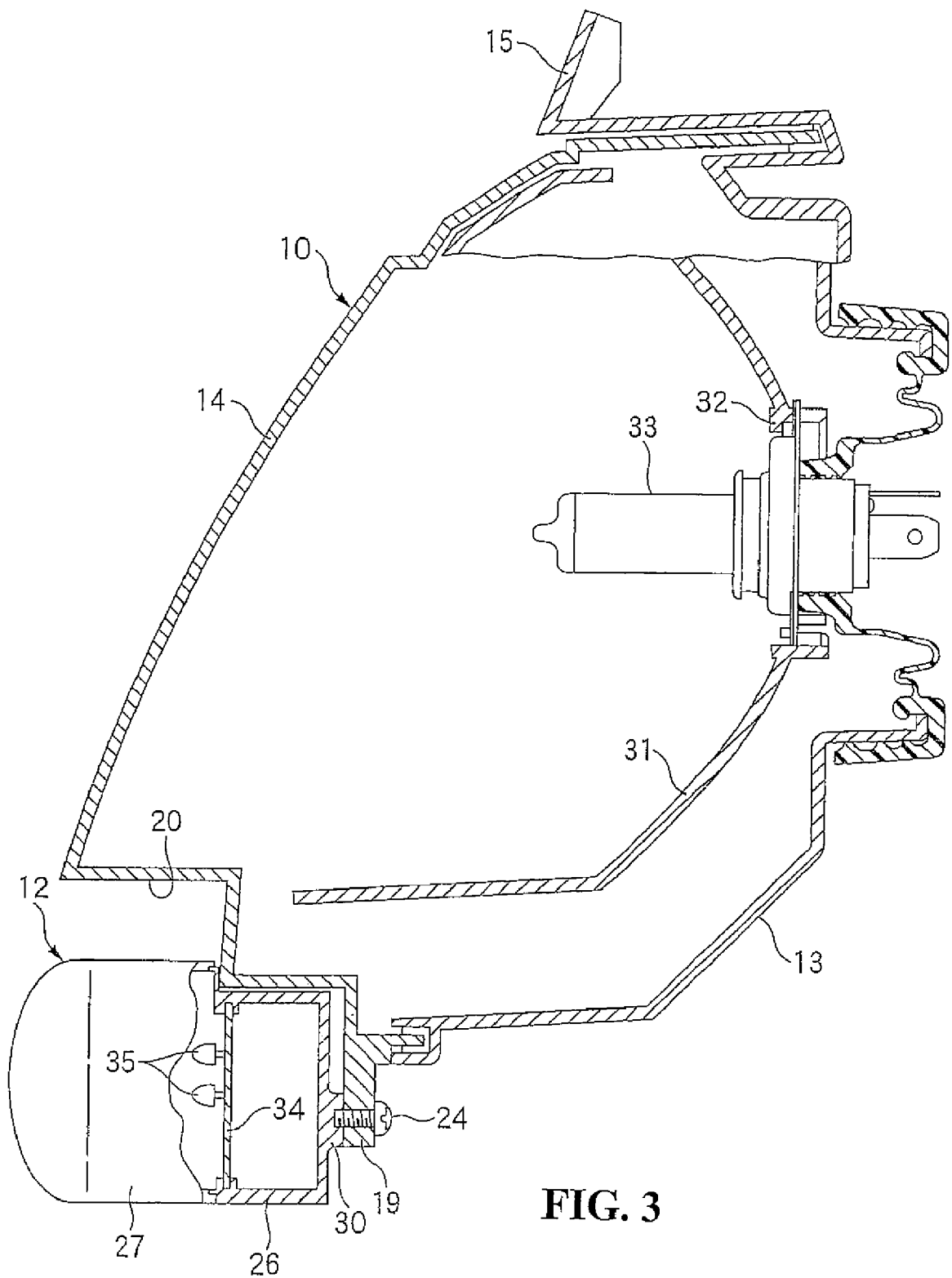
FIG. 3 is a cross-sectional view taken along line I-I of FIG. 1.

Referring to FIG. 3, the headlight case 13 includes a bulb mounting portion 32 formed at a center of a reflector 31. A bulb 33, for example a halogen bulb, is mounted in the bulb mounting portion 32.

The position light 12 includes a board 34 fixed to the position light case 26. Six white LEDs (light emitting diodes) 35 are mounted on the board 34. The board 34 is electrically connected to a control circuit mounted in the vehicle through a connector or the like not shown. The LEDs 35 thus emit light as current is supplied thereto from the control circuit.

Figure 4:
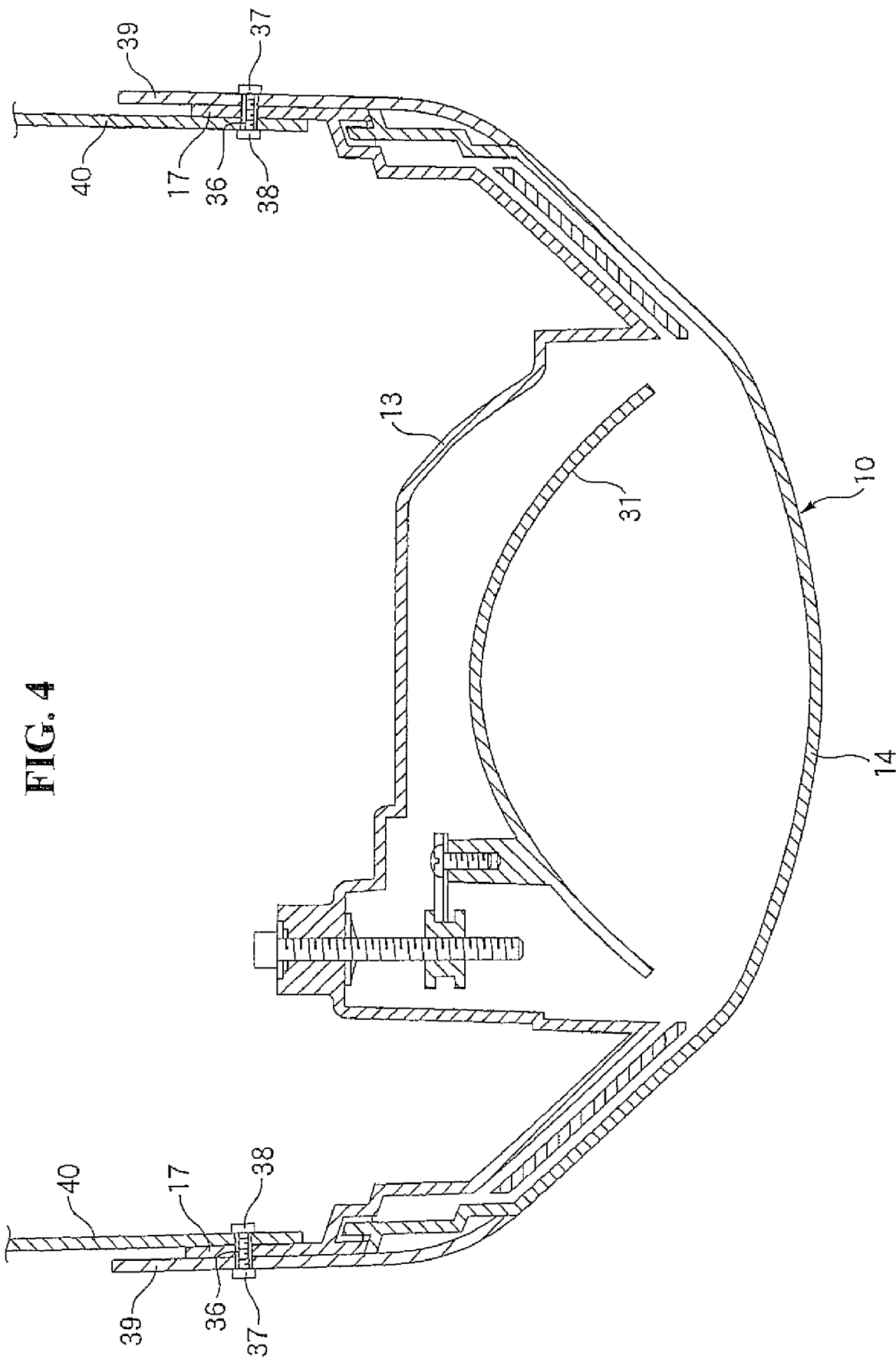
FIG. 4 is a cross-sectional view taken along line II-II of FIG. 1.

Referring to FIG. 4, the headlight case 13 is secured in place by a bolt 37 and a nut 38 by way of a rubber damper 36 as an elastic member, with a headlight stay 40 disposed on the side of the vehicle at a backside of the upper bracket 17 and a cowl 39 including a front cowl and a side cowl disposed on a front side of the upper bracket 17.

Figure 5:
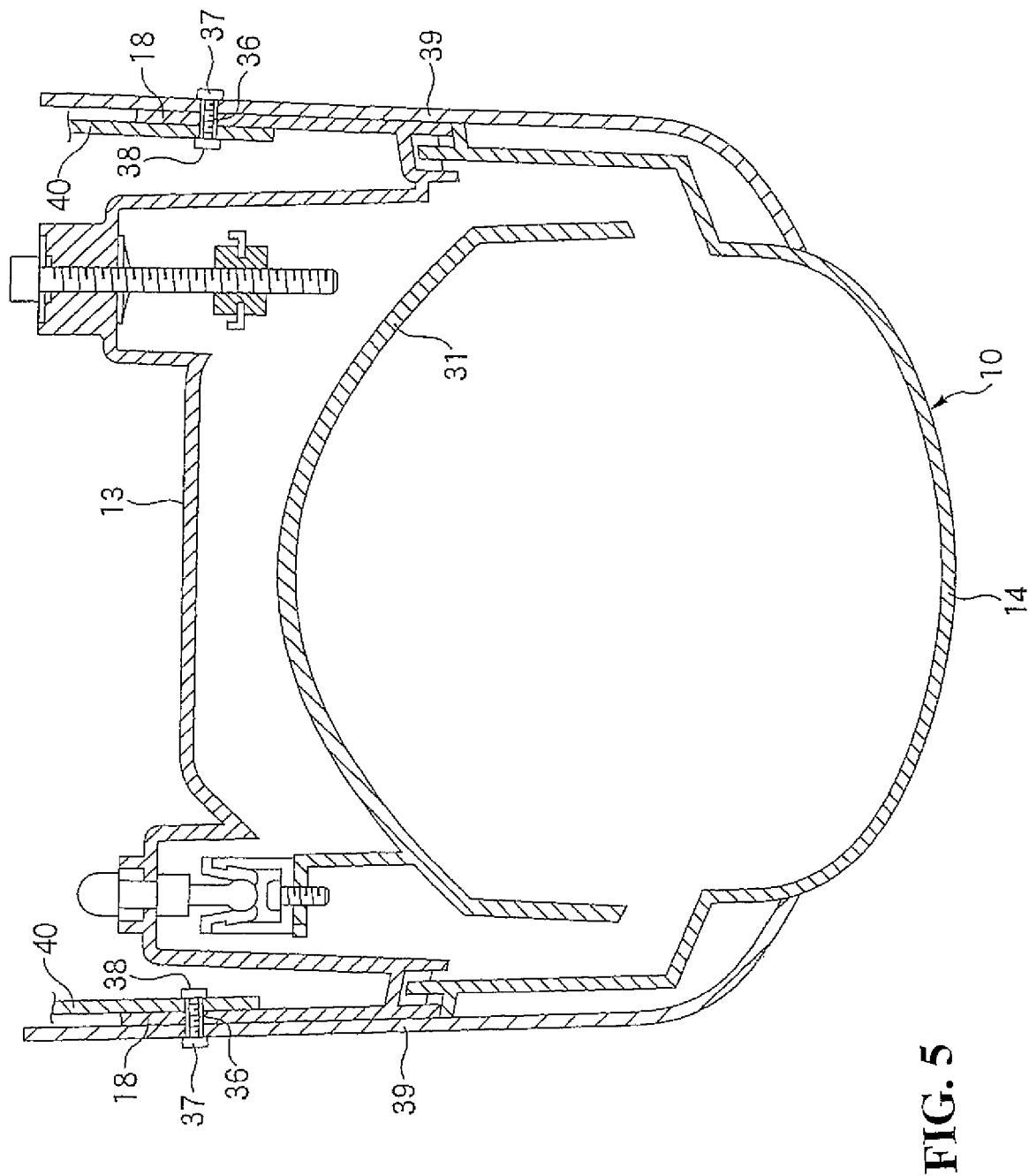
FIG. 5 is a cross-sectional view taken along line III-III of FIG. 1.

Referring to FIG. 5, the headlight case 13 is secured in place by a bolt 37 and a nut 38 by way of a rubber damper 36 as an elastic member, with the headlight stay 40 disposed on a backside of the lower bracket 18 and the cowl 39 disposed on a front side of the lower bracket 18. It is to be noted that the headlight stay 40 may be secured to the headlight case 13 by screwing a screw from the side of the cowl 39 into the headlight stay 40, instead of the bolt 37 and the nut 38.

Being elastically mounted with the cowl 39 on the side of the vehicle body, the headlight case 13 forms a rigid vehicle body structure used as a structural member including the cowl 39. The headlight case 13 and the cowl 39, being assembled to the headlight stay 40 via the rubber damper 36, are not directly subjected to vehicle body vibration. In addition, the headlight unit 10 and the position light 12 are assembled into the vehicle body with an outside of the headlight lens 14 and the position light lens 27 covered with the cowl 39. This arrangement hides the headlight lens fixing brackets 28, 29 (see FIG. 1) to add to good appearance design.

In the motorcycle front lighting apparatus structure as described heretofore, the position light 12 is disposed in a condition protruding downwardly from the lower edge of the headlight unit 10. When the position light 12 is to be made larger with the aim of improved indication performance and appearance, the position light 12 can be designed independently of the headlight unit 10. This facilitates making the position light 12 large.

In the front lighting apparatus structure according to the embodiment of the present invention, the position light 12 is removably mounted independently of the headlight unit 10. This allows the position light 12 to be repaired individually, independently of the headlight unit 10. This makes the front lighting apparatus structure according to the embodiment of the present invention advantageous in terms of repair cost.

In the front lighting apparatus structure according to the embodiment of the present invention, the meter unit 11 is directly mounted on the upper portion of the headlight unit 10. As compared with the arrangement, in which the meter unit is mounted via a stay on the side of the vehicle body, a heavy-weight part, such as the stay, can be disused to make the mounting structure even simpler and lighter in weight.

In the front lighting apparatus structure according to the embodiment of the present invention, the headlight case 13 of the headlight unit 10 is mounted in the cowl 39, while the cowl 39 is elastically mounted in the headlight stay 40 on the side of the vehicle body. This arrangement allows the headlight unit 10 and the cowl 39 to be used as a structural member to form a rigid vehicle body structure.

In the front lighting apparatus structure according to the embodiment of the present invention, the position light 12 is mounted on the headlight lens 14 of the headlight unit 10. This achieves a simple mounting structure without involving a stay or the like on the side of the vehicle body.

In the front lighting apparatus structure according to the embodiment of the present invention, the position light 12 has a light source including the plurality of LEDs 35, which makes an illuminating area large.

The position light 12 may be mounted on the side of the headlight case 13, in addition to the side of the headlight lens 14. Alternatively, the headlight stay 40 disposed on the side of the vehicle body may be extended downwardly so that the position light 12 can be mounted thereon.

FIGS. 6 through 17 are views showing a second embodiment of the present invention.

Figure 6:
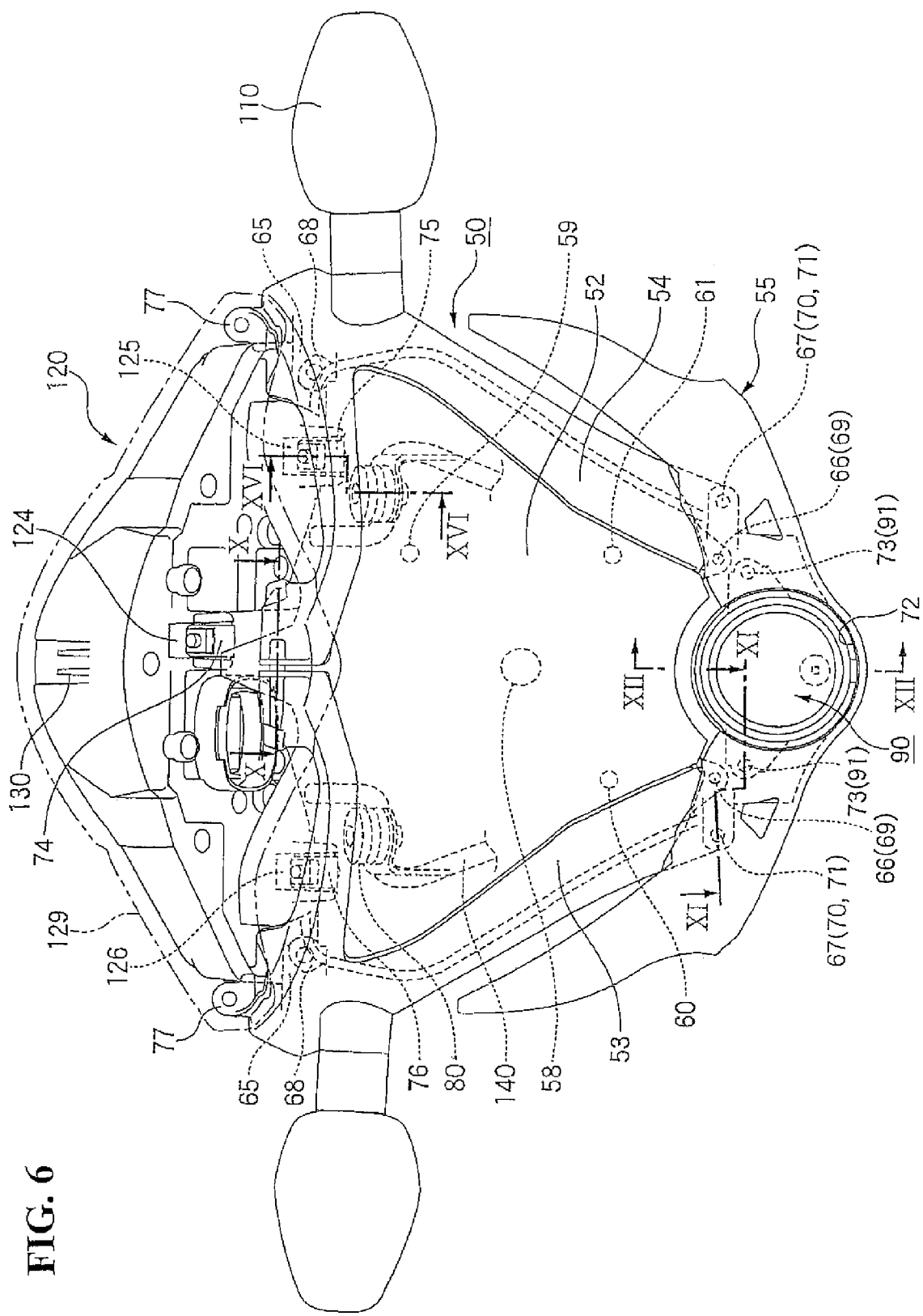
FIG. 6 is a front view for illustrating a front lighting apparatus structure for a motorcycle according to a second embodiment of the present invention.
Figure 7:
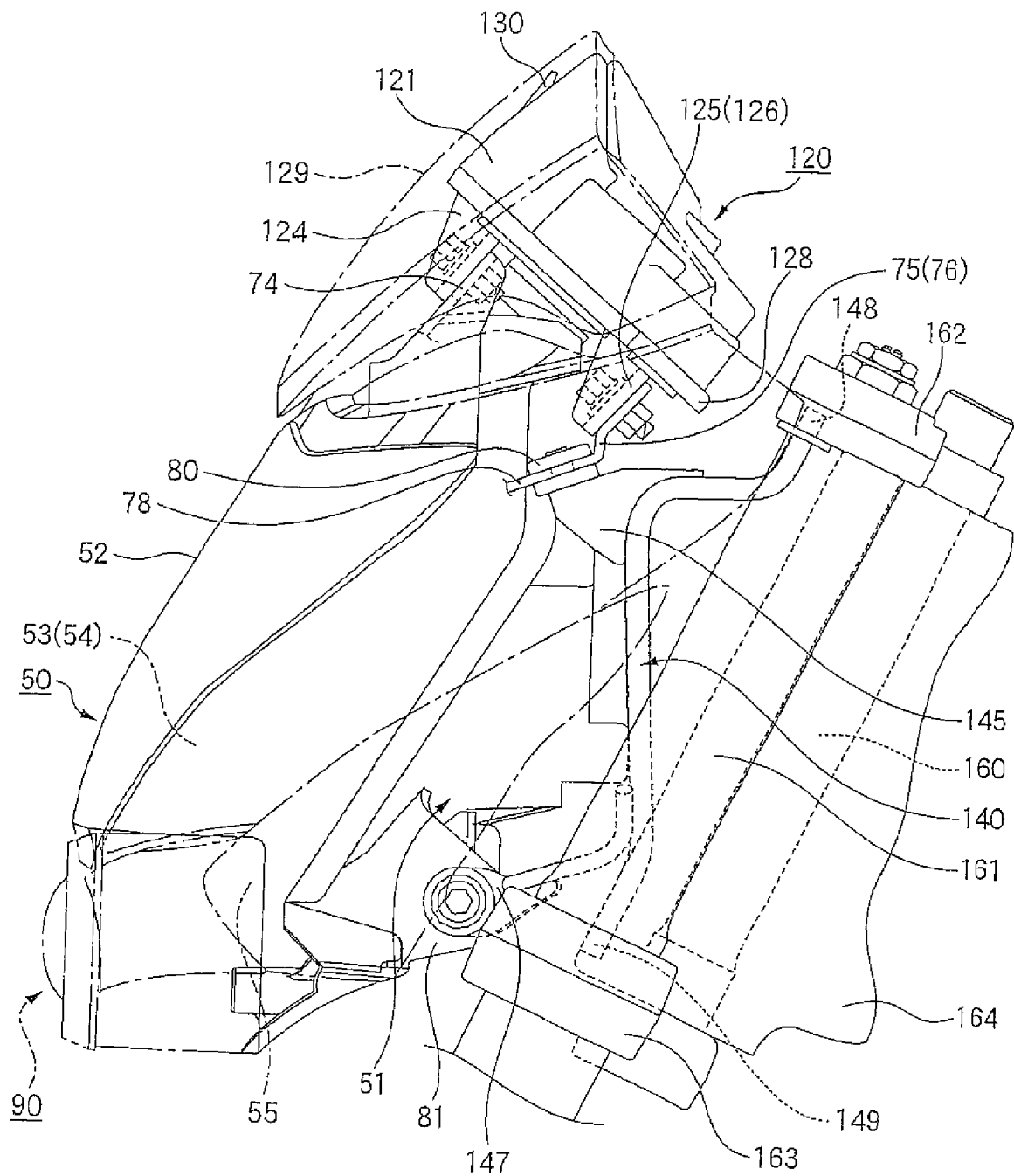
FIG. 7 is a side elevational view showing the front lighting apparatus structure mounted at the front side of the motorcycle.
Figure 8:
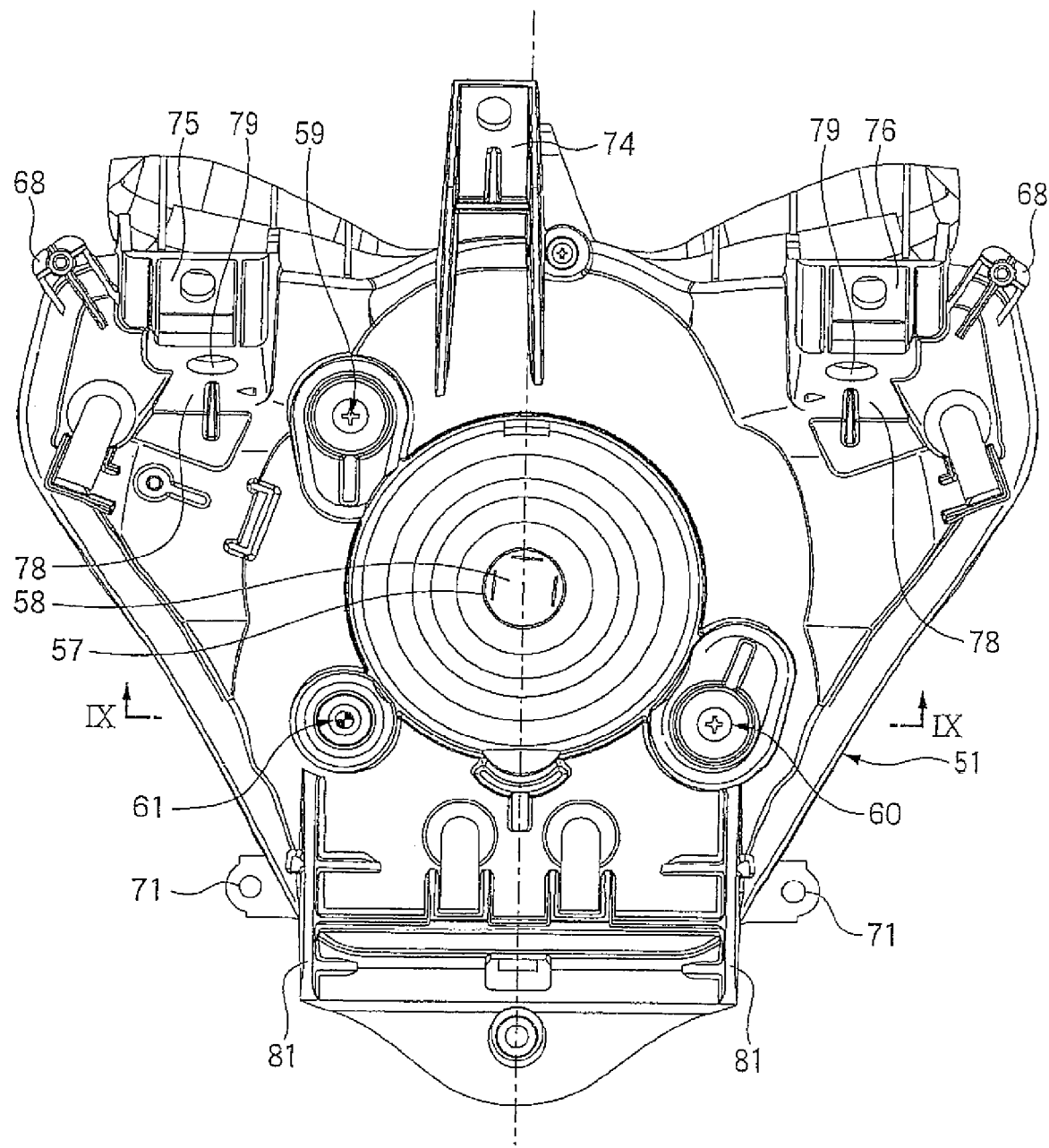
FIG. 8 is a back view showing a headlight unit shown in FIG. 6.

Referring to FIGS. 6 through 8, the front lighting apparatus structure for a motorcycle according to the second embodiment of the present invention includes a headlight unit 50, a position light 90, a turn signal light 110, a meter unit 120, and a headlight stay 140 for mounting the foregoing parts at the front side of the motorcycle.

The headlight unit 50 includes a headlight case 51, a headlight lens 52, a pair of headlight side covers 53, 54, and a headlight lower cover 55. More specifically, the headlight lens 52 is a transparent part disposed at a front portion of the headlight case 51, having a substantially V-shaped front view. The pair of headlight side covers 53, 54 covers an upper portion and sides of the headlight lens 52. The headlight lower cover 55 covers an area surrounding the position light 90 disposed at a lower portion of the headlight lens 52 and extends obliquely upwardly alongside the headlight side covers 53, 54.

Figure 9:
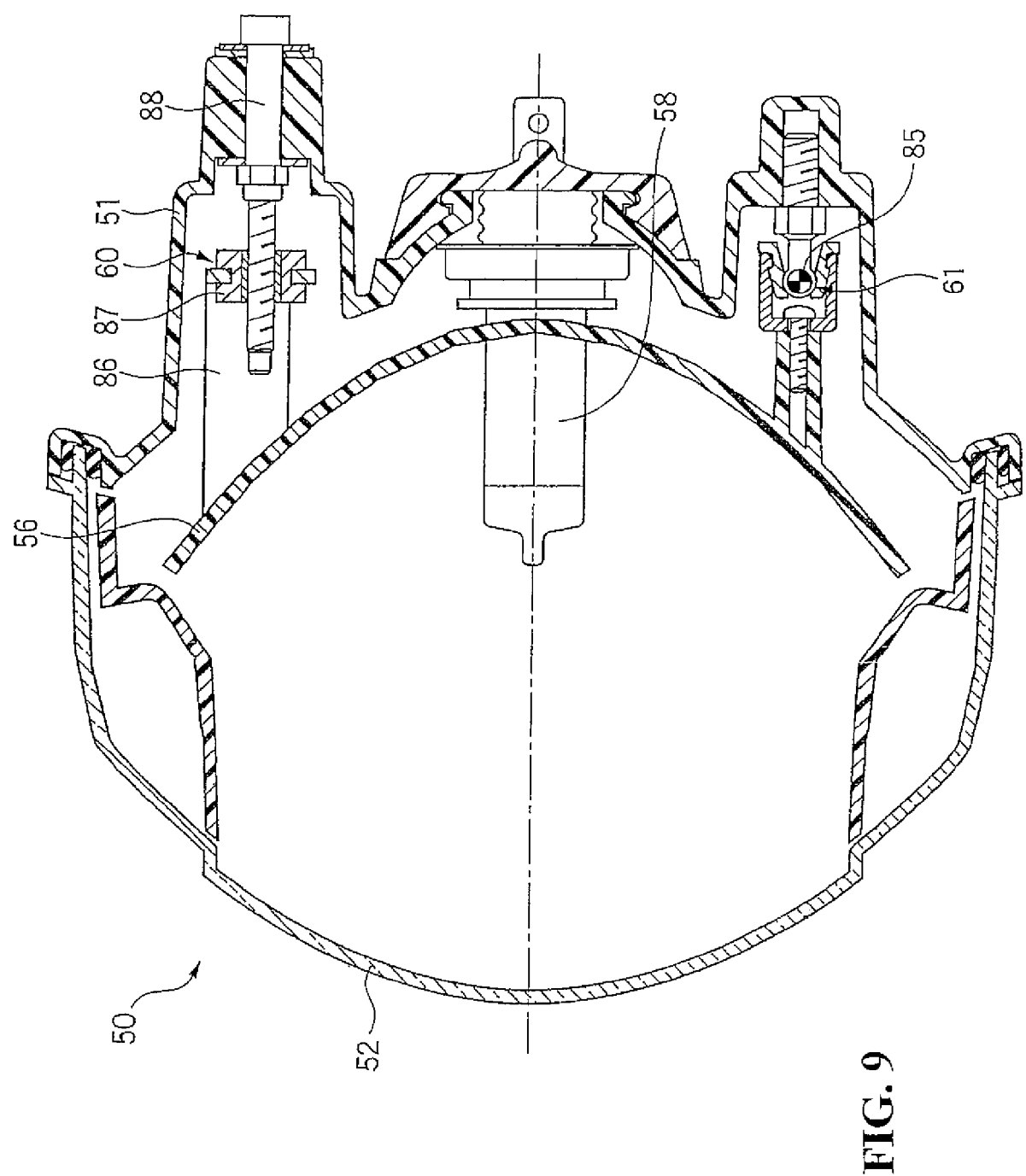
FIG. 9 is a cross-sectional view taken along line IX-IX of FIG. 8.
Figure 10:
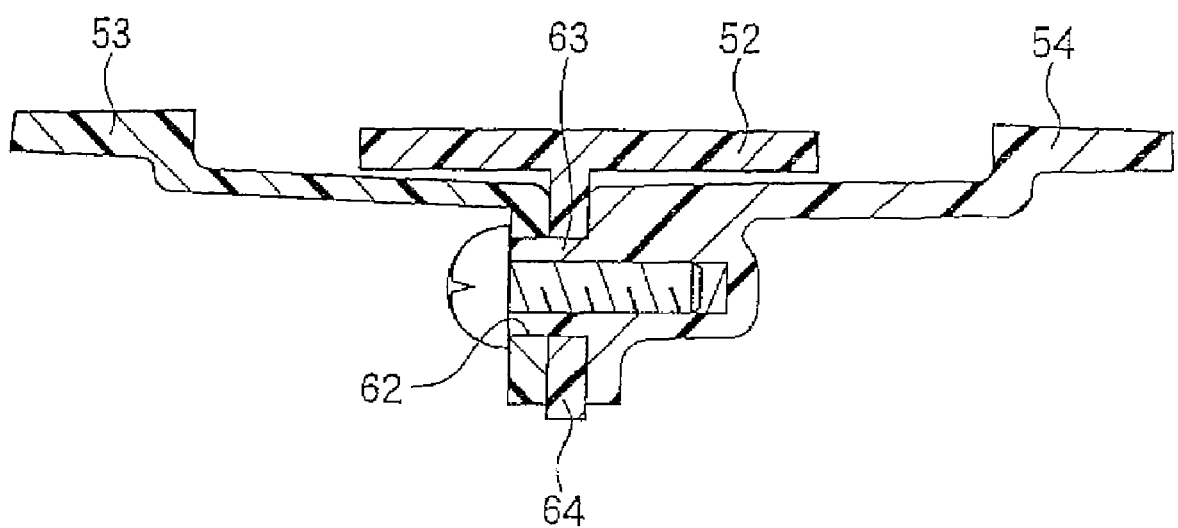
FIG. 10 is a cross-sectional view taken along line X-X of FIG. 6, showing mounting of a headlight lens and headlight side covers.

Referring to FIGS. 8 and 9, the headlight case 51 includes a bulb mounting portion 57 formed therein to face a center hole in a reflector 56. A bulb 58, for example a halogen bulb, is mounted in the bulb mounting portion 57. The reflector 56 is fitted to the headlight case 51 by vertical and horizontal aiming adjustment portions 59, 60 and a rocking motion center 61 that serves as a center of rocking motion for the vertical and horizontal aiming adjustment portions 59, 60. The rocking motion center 61 supports the reflector 56 horizontally and vertically rockably by means of a spherical member 85 fixed in the headlight case 51. The horizontal aiming adjustment portion 60 includes an internally threaded member 87 operatively connected with a protrusion 86 extended rearwardly from the reflector 56 and an externally threaded member 88 supported in the headlight case 51. The internally threaded member 87 and the externally threaded member 88 are screwed together. Rotating the externally threaded member 88 varies a relative position between the internally threaded member 87 and the externally threaded member 88 so that the reflector 56 is rocked horizontally about the rocking motion center 61. The vertical aiming adjustment portion 59, being constructed in the same manner as the horizontal aiming adjustment portion 60, rocks the reflector 56 vertically about the rocking motion center 61.

The headlight side covers 53, 54 are fixed together as follows. Specifically, referring to FIG. 10, at a center at an upper portion, a fitting hole 62 made in a first headlight side cover is fitted over a boss 63 provided in a second headlight side cover. Then, with an upper lock tab 64 of the headlight lens 52 clamped, the headlight side covers 53, 54 are screwed together.

Figure 11:
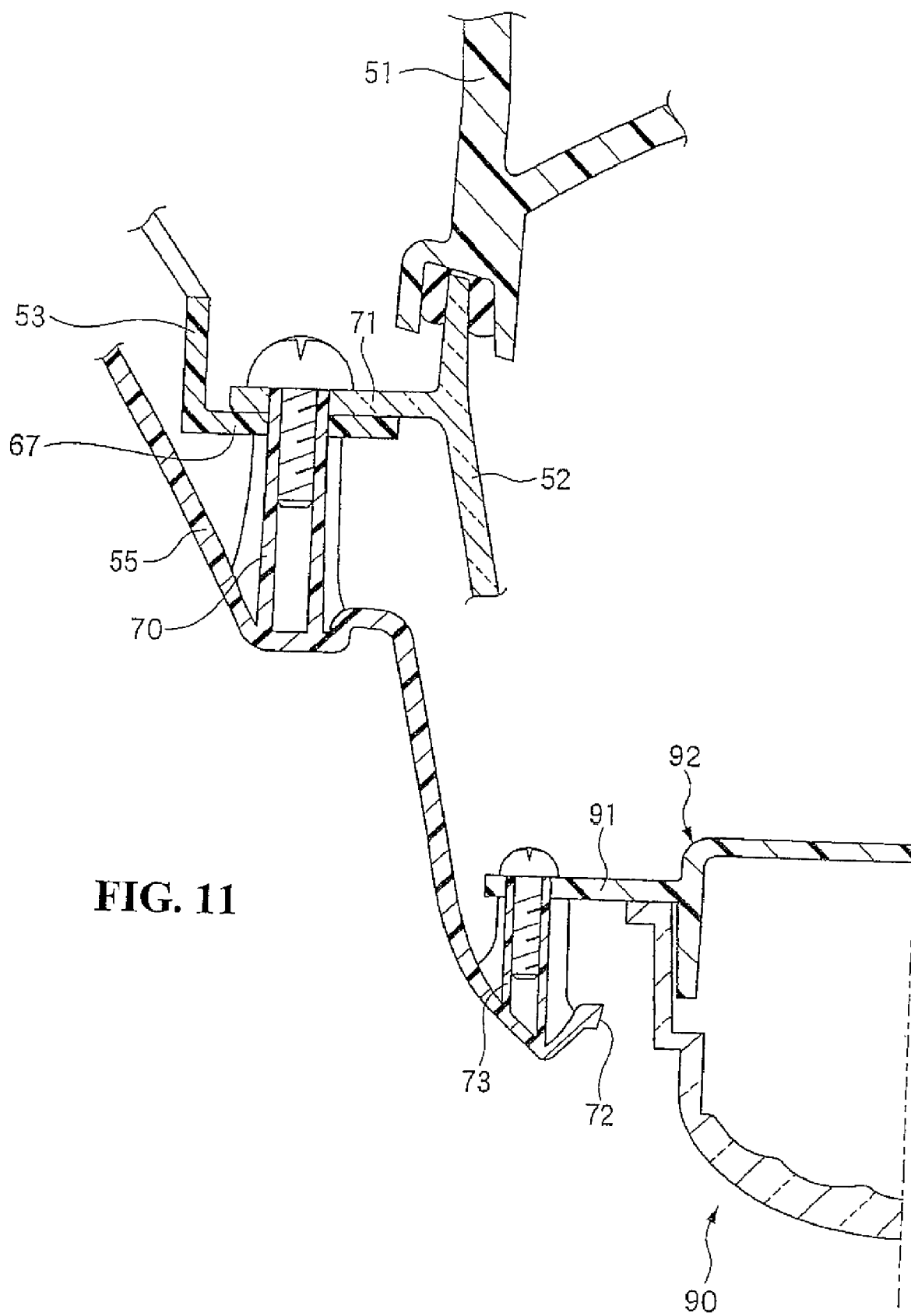
FIG. 11 is a cross-sectional view taken along line XI-XI of FIG. 6.

Referring to FIG. 6, each of the headlight side covers 53, 54 includes a side bracket 65, a lower forward bracket 66, and a lower rearward bracket 67. The side brackets 65 are disposed on a backside at an upper portion on both sides. The lower forward brackets 66 are disposed on lower forward portions. The lower rearward brackets 67 are disposed on lower rearward portions. The side brackets 65 are fastened, from a backside, with a pair of side cover side mounting tabs 68 disposed at upper portions on both sides of the headlight case 51. Referring to FIGS. 6 and 11, the lower forward brackets 66 are fastened from a backside to a pair of side cover lower forward mounting bosses 69. Further, the lower rearward brackets 67 are fastened, together with a side extension bracket 71 extending sideways at a lower portion of the headlight lens 52, to a pair of side cover lower rearward mounting bosses 70 disposed on the backside of the headlight lower cover 55. In FIG. 6, the turn signal light 110 is disposed on each of the headlight side covers 53, 54.

Referring to FIGS. 6 and 11, the headlight lower cover 55 includes, in addition to the side cover lower forward mounting bosses 69 and the side cover lower rearward mounting bosses 70, an opening hole 72 formed at a middle portion thereof, in which the position light 90 is disposed. A pair of position light mounting bosses 73 for fastening a pair of mounting tabs 91 of the position light 90 is formed at a backside on both sides of the opening hole 72.

Referring to FIGS. 11 through 14, the position light 90 is secured in place as follows. Specifically, the pair of mounting tabs 91 extending sideways a position light case 92 is fastened to the position light mounting bosses 73 of the headlight lower cover 55. Further, a boss 93 formed on a backside at a center of a lower portion of the position light case 92 is fastened to the headlight case 51.

The position light 90 is constructed as follows. Specifically, a board 94 is fixed together with a reflector 100 to the position light case 92. Five white LEDs (light emitting diodes) 95 are mounted on the board 94. The board 94 is electrically connected to a control circuit mounted on the vehicle through a connector or the like not shown. Current supplied from the control circuit illuminates the LEDs 95. Two position light lenses, specifically, an outer lens 96 and an inner lens 97, are mounted on the position light case 92. A lens cut 98 having a substantially hexagonal front view is formed on a backside of the outer lens 96. The inner lens 97 has a front surface on which a lens cut 99 having a substantially hexagonal shape smaller than the lens cut 98 is formed. In the position light 90, the reflector 100 is mounted together with the board 94 on the position light case 92 so as to surround the LEDs 95.

Figure 12:
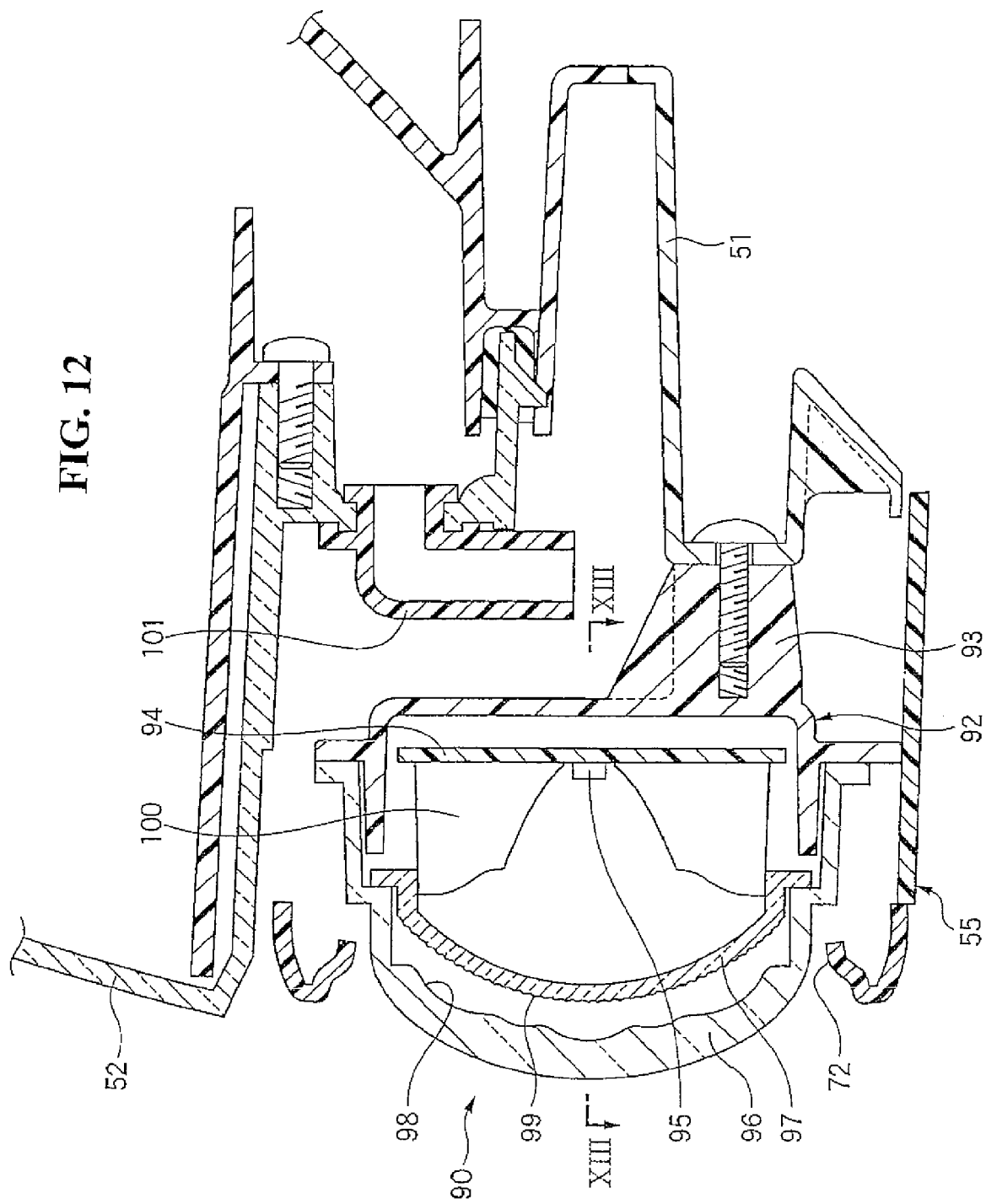
FIG. 12 is a cross-sectional view taken along line XII-XII of FIG. 6.
Figure 13:
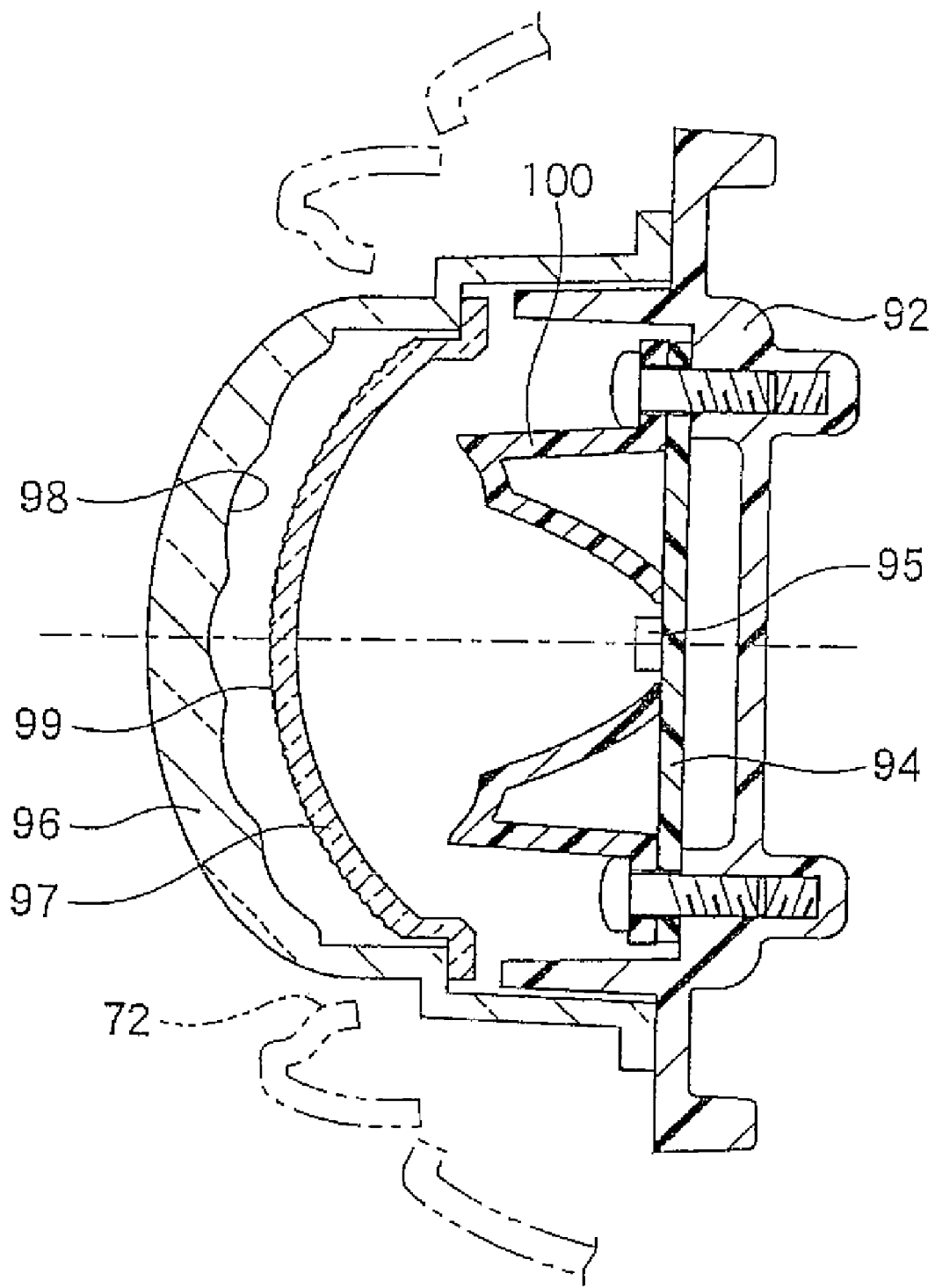
FIG. 13 is a cross-sectional view taken along line XIII-XIII of FIG. 12.
Figure 14:
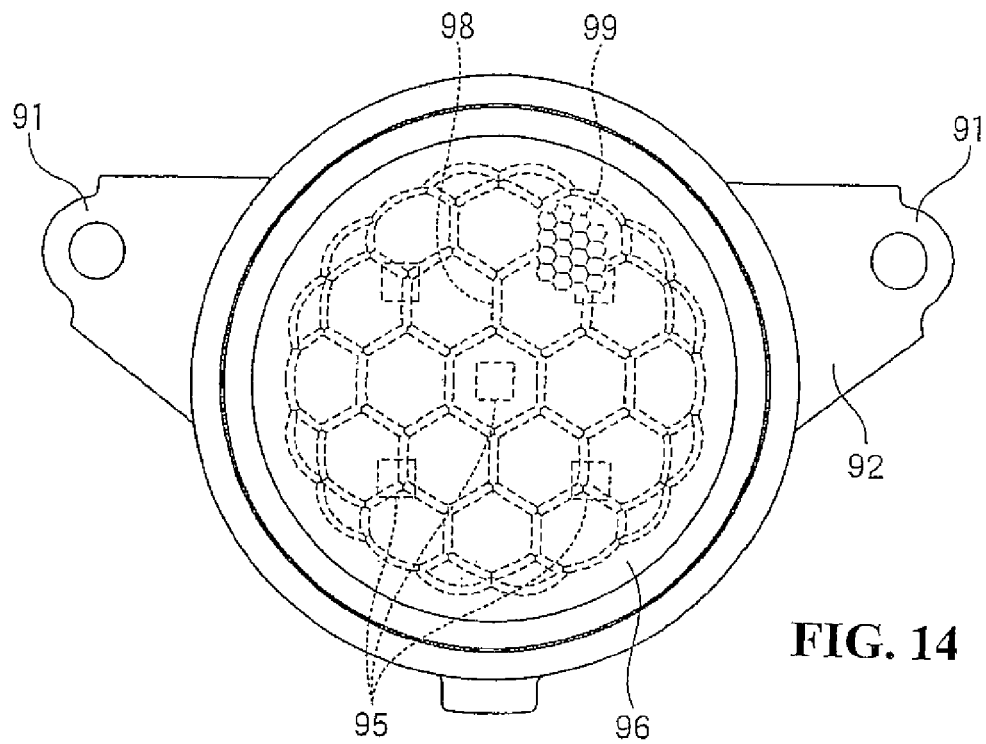
FIG. 14 is a front view for illustrating a lens cut of a position light.

Referring to FIG. 12, a tubular member 101 forming a vent port is disposed near a mounting portion with the headlight case 51 rearward the position light 90 and at a lower portion of the headlight lens 52. This enhances a defogging effect of the lower portion of the headlight case 51.

Figure 15:
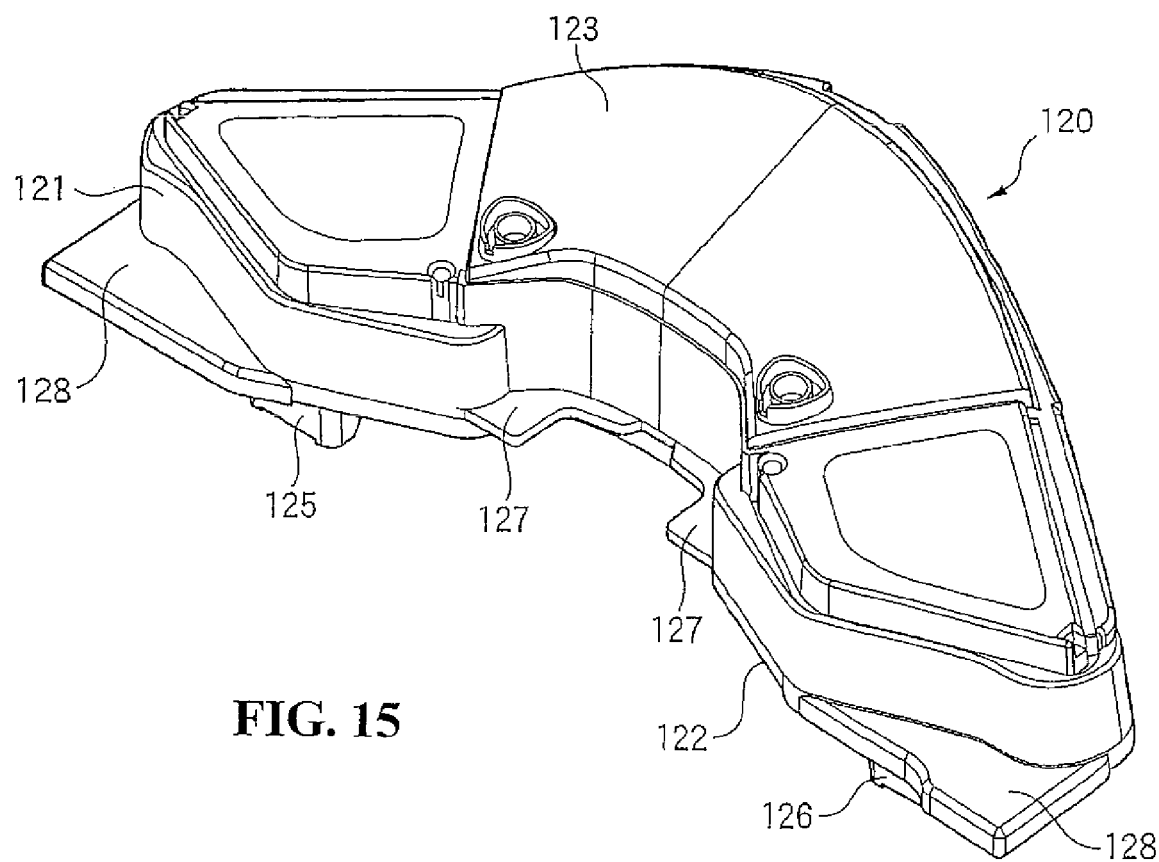
FIG. 15 is a perspective view showing a meter unit.
Figure 16:
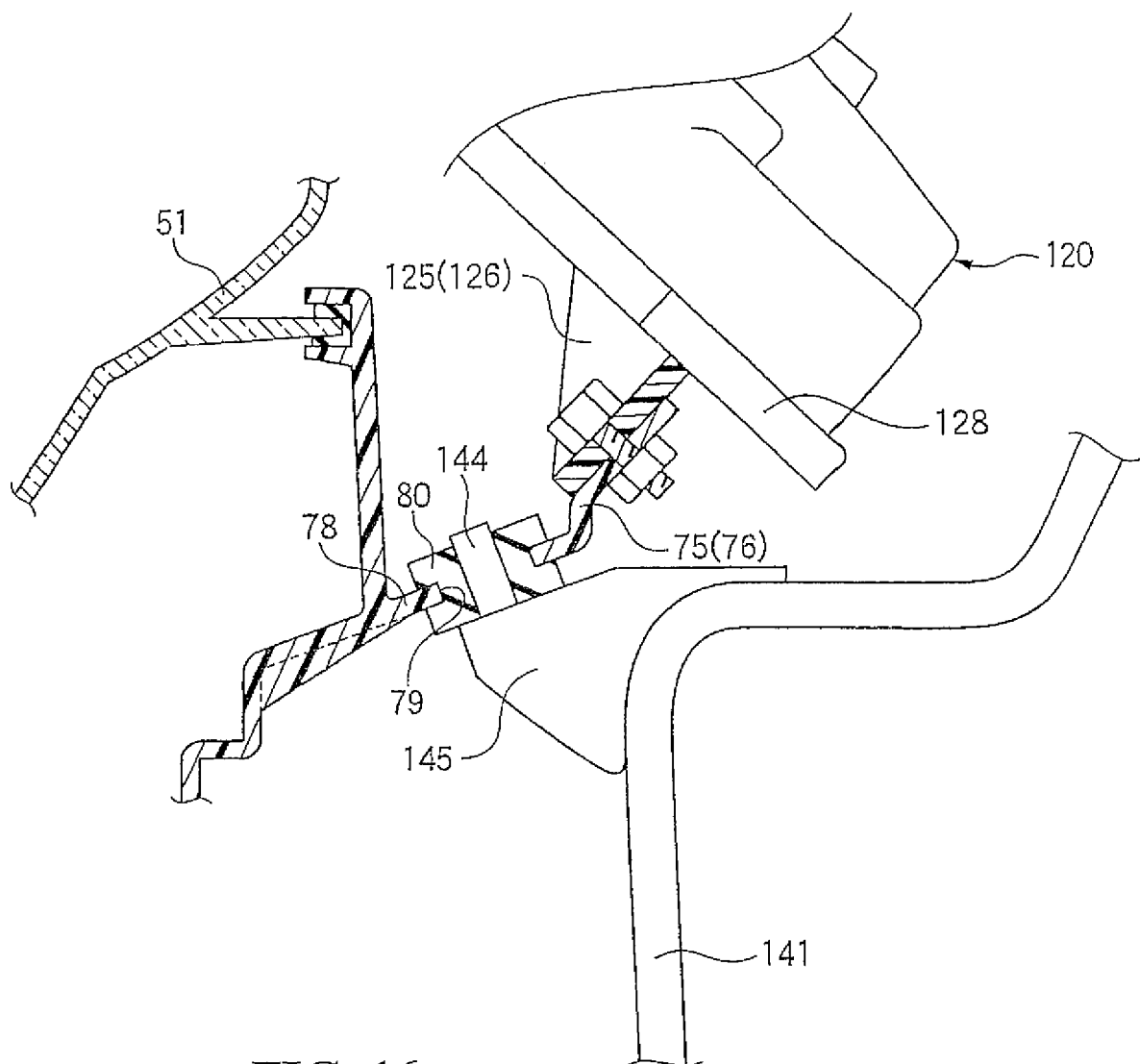
FIG. 16 is a cross-sectional view taken along line XVI-XVI of FIG. 7.

Referring to FIG. 15, the meter unit 120 includes an upper case 121 and a lower case 122, in which a speedometer, a tachometer, a fuel gauge, and other types of meters are accommodated. A transparent cover member 123 is fitted over the upper case 121. Referring to FIGS. 7 and 16, the meter unit 120 is fitted to the headlight unit 50 as follows. Specifically, headlight mounting brackets 124, 125, 126 disposed at a center at the front and on both sides in the rear, respectively, of the lower case 122 are fastened to meter mounting brackets 74, 75, 76 disposed, similarly, at a center at the front and on both sides in the rear, respectively, upward the headlight case 51.

The upper case 121 of the meter unit 120 includes protectors 127, 128 extending rearwardly and disposed at a center and on both sides in the rear thereof. The protectors 128 on both sides cover upward portions in the rear of the headlight mounting brackets 125, 126 as shown in FIG. 16. The protectors 128 shield from an outside mounting portions on both sides in the rear of the meter unit 120 and the headlight unit 50 disposed downwardly thereof and engagement portions between the headlight unit 50 and the headlight stay 140 to be described later. The protectors 128 thereby enhance appearance. The protectors 127 at the center suppress entry of water in the headlight unit 50 disposed downwardly thereof.

A meter visor 129 is disposed forwardly of the meter unit 120 so as to cover a front portion of the meter unit 120 and an upper portion of the headlight unit 50. The meter visor 129 is specifically secured to the meter unit 120 and the headlight unit 50 as follows. The meter visor 129 is first locked in a lock portion 130 formed at a front portion of the upper case 121 of the meter unit 120. The meter visor 129 is then fastened to mounting tabs 77 extended upwardly from upper portions of the headlight side covers 53, 54.

Figure 17:
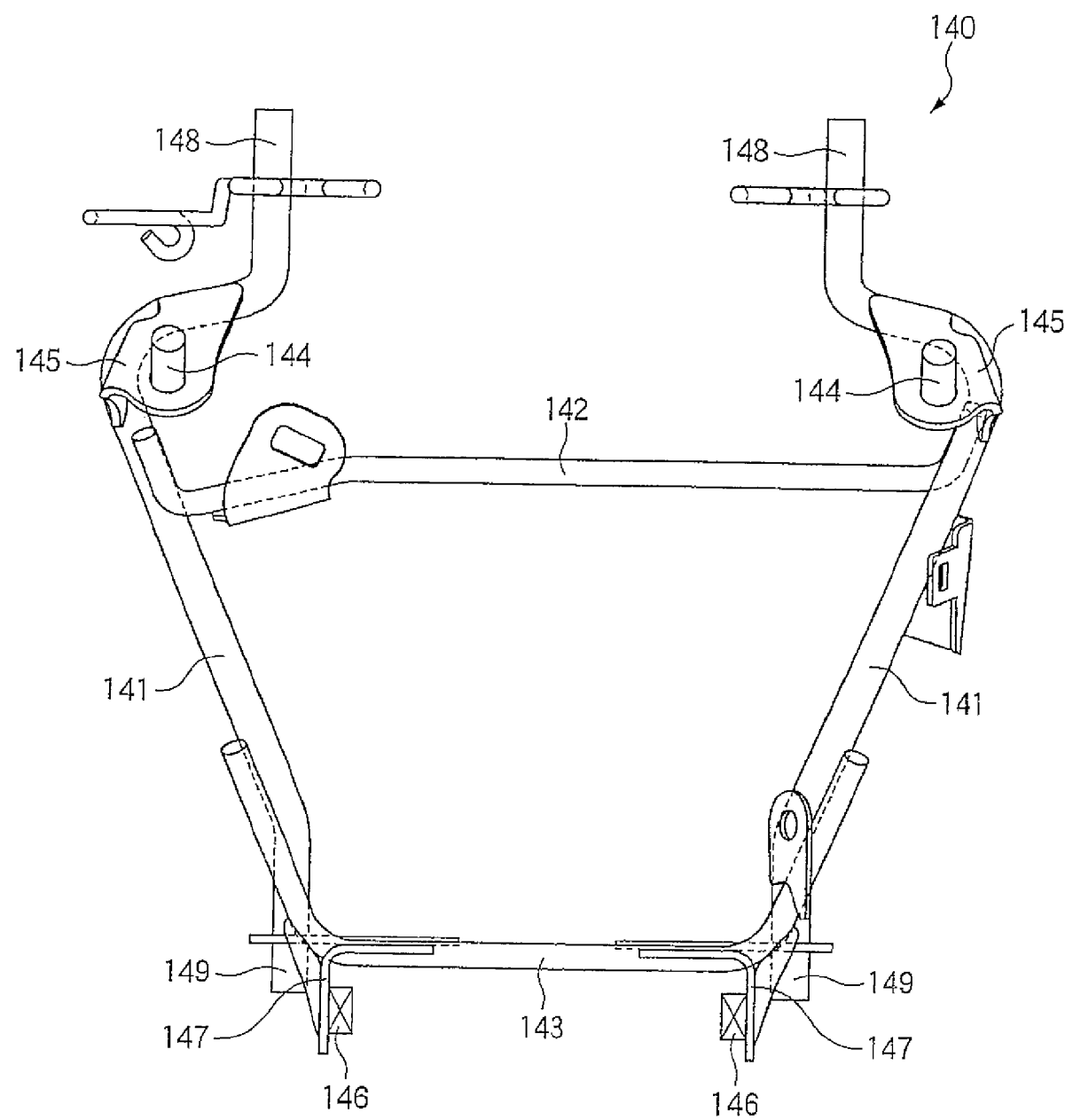
FIG. 17 is a front view showing a stay.

The headlight unit 50 integrated with the position light 90 and the meter unit 120 is mounted at the front portion of the motorcycle via the headlight stay 140. Referring to FIG. 17, the headlight stay 140 includes two vertical bars 141 and two horizontal bars 142, 143. Each of the two vertical bars 141 is partly curved and extended vertically. The horizontal bars 142, 143 extend in a crosswise direction, having both ends curved to be welded to the vertical bars 141 at a middle portion and a lower portion of the vertical bars 141, respectively. A stay tab 145 is welded and fixed to each of the vertical bars 141 at the middle portion thereof. The stay tab 145 has a pin member 144 provided therein in a standing condition. In addition, a stay tab 147, in which a weld nut 146 is fixed, is welded and fixed at a lower portion of the lower horizontal bar 143 and each of the vertical bars 141.

Referring to FIG. 7, each of the vertical bars 141 has an upper end 148 and a lower end 149 inserted in place in a steering shaft 160, and a top bridge 162 and a bottom bridge 163 supporting a front fork 161. A rubber bushing 80 is then fitted into a mounting hole 79 in a pin engagement portion 78 formed integrally for shared use with the meter mounting brackets 75, 76 of the head light case 51. The rubber bushing 80 is then fitted externally to the pin member 144 of the stay tab 145. The upper portion of the headlight unit 50 is thereby inserted in and engaged with the pin member 144 of the headlight stay 140. Further, a pair of stay mounting brackets 81 extending rearwardly at the lower portion of the headlight case 51 is fastened to the stay tabs 147 at the lower portion of the headlight stay 140 in a vehicle width direction. The headlight unit 50 is thus secured to the headlight stay 140. Referring to FIG. 7, reference numeral 164 denotes a main frame surrounding the steering shaft 160.

In the front lighting apparatus structure according to the second embodiment of the present invention, the position light 90 is disposed at the lower portion of the headlight unit 50 and outside the headlight lens 52. When the position light 90 is to be made larger with the aim of improved indication performance and appearance, the position light 90 can be designed independently of the headlight unit 50. This facilitates making the position light 90 large.

In addition, the position light 90 is removably mounted in the headlight unit 50. This allows the position light 90 to be repaired individually, independently of the headlight unit 50. This makes the front lighting apparatus structure advantageous in terms of repair cost.

In addition, the position light 90 has an upper portion mounted in the headlight lower cover 55 disposed at the lower portion of the headlight unit 50. Further, the position light 90 has a lower portion attached to a side of the headlight unit 50. This allows the headlight unit 50 and the position light 90 to be compactly assembled together.

Further, the meter unit 120 is mounted on the upper portion of the headlight unit 50. As compared with a common arrangement of mounting the meter unit 120 via a meter stay disposed on the side of the vehicle body, a heavy part including the stay can be disused to achieve a simple and lightweight mounting structure.

According to the mounting structure for the headlight unit 50, the headlight stay 140 is disposed between the top bridge 162 and the bottom bridge 163 supporting the front fork 161. The headlight unit 50 has the upper portion inserted in and engaged with the pin member 144 of the headlight stay 140 from the above. Further, the headlight unit 50 has the lower portion fastened to the lower portion of the headlight stay 140. This helps make the headlight case 51 smaller and improve assemblability.

The headlight case 51 includes the meter mounting brackets 75, 76 formed thereon for mounting the meter unit 120 on the headlight unit 50. The pin engagement portion 78, into which the pin member 144 is inserted, is formed integrally with the meter mounting brackets 75, 76. The pin engagement portion 78 is shared with the meter mounting brackets 75, 76. This makes for an even more compact headlight unit 50.

The position light 90 is disposed at the lower portion of the headlight unit 50 and outside the headlight lens 52. The position light 90 and the headlight unit 50 can therefore be redesigned easily.

Further, the meter unit 120 is mounted on the upper portion of the headlight unit 50. As compared with the common arrangement of mounting the meter unit 120 via a meter stay disposed on the side of the vehicle body, a heavy part including the stay can be disused to achieve a simple and lightweight mounting structure.

Further, the meter unit 120 has the headlight mounting brackets 125, 126 on the underside thereof. The meter unit 120 also includes the protectors 128 covering the rear upper portions of the headlight mounting brackets 125, 126. This shields from the outside the mounting portions of the headlight unit 50 and the meter unit 120 and the engagement portions between the headlight unit 50 and the headlight stay 140, achieving improved appearance.

Moreover, the headlight unit 50 performs aiming adjustment by adjusting the position of the reflector 56 relative to the headlight case 51. Aiming adjustment can therefore be performed independently of the position of the meter unit 120.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A front lighting apparatus structure for a motorcycle comprising:
    a headlight; and
    a position light;
    wherein the position light is disposed at a lower portion of the headlight and outside a lens of the headlight,
    wherein the position light includes a position light case which is independently removably mounted on the headlight.

2. The front lighting apparatus structure according to claim 1,
    wherein the position light has an upper portion mounted on a headlight lower cover disposed at the lower portion of the headlight, and a lower portion mounted on a side of the headlight.

3. The front lighting apparatus structure according to claim 2,
    wherein the position light includes a position light case,
    the position light case including laterally extending mounting tabs which are attached to the headlight lower cover, and a boss formed on a backside thereof which is fastened to a case of the headlight.

4. The front lighting apparatus structure according to claim 1, further comprising a meter unit is disposed on an upper portion of the headlight.

5. The front lighting apparatus structure according to claim 1, further comprising a meter unit,
    wherein the meter unit includes at least one bracket for attaching the meter unit to a case of the headlight.

6. The front lighting apparatus structure according to claim 1, further comprising a meter unit having a pair of headlight mounting brackets on an underside thereof,
    wherein the headlight mounting brackets are attached to a pair of meter mounting brackets formed on a rear portion of a case of the headlight.

7. The front lighting apparatus structure according to claim 1, further comprising a meter unit having a pair of headlight mounting brackets on an underside thereof,
    wherein the headlight includes a case, the case including a pin engagement portion and a pair of meter mounting brackets projecting from on a rear portion thereof
    wherein the pin engagement portion is adapted to receive a pin mounted on a headlight stay, and
    the meter mounting brackets are attached to the pair of headlight mounting brackets on the underside of the meter unit.

8. A front lighting apparatus structure for a motorcycle comprising:
    a headlight; and
    a position light including multiple LEDs;
    wherein the position light is disposed at a lower portion of the headlight and outside a lens of the headlight,
    wherein the position light includes a position light case which is independently removably mounted on the headlight.

9. The front lighting apparatus structure according to claim 8,
    wherein the position light has an upper portion mounted on a headlight lower cover disposed at the lower portion of the headlight, and a lower portion mounted on a side of the headlight.

10. The front lighting apparatus structure according to claim 9,
    wherein the position light includes a position light case,
    the position light case including laterally extending mounting tabs which are attached to the headlight lower cover, and a boss formed on a backside thereof which is fastened to a case of the headlight.

11. The front lighting apparatus structure according to claim 8, further comprising a meter unit is disposed on an upper portion of the headlight.

12. The front lighting apparatus structure according to claim 8, further comprising a meter unit having a pair of headlight mounting brackets on an underside thereof
    wherein the headlight mounting brackets are attached to a pair of meter mounting brackets formed on a rear portion of a case of the headlight.

13. The front lighting apparatus structure according to claim 8, further comprising a meter unit having a pair of headlight mounting brackets on an underside thereof,
    wherein the headlight includes a case, the case including a pin engagement portion and a pair of meter mounting brackets projecting from on a rear portion thereof
    wherein the pin engagement portion is adapted to receive a pin mounted on a headlight stay, and
    the meter mounting brackets are attached to the pair of headlight mounting brackets on the underside of the meter unit.

14. A front lighting apparatus structure for a motorcycle comprising:
    a headlight mounted on a front fork;
    a position light disposed at a lower portion of the headlight and outside a lens of the headlight; and
    a meter unit disposed on an upper portion of the headlight,
    wherein the meter unit includes a pair of headlight mounting brackets on an underside thereof, and
    wherein the headlight mounting brackets are attached to a pair of meter mounting brackets formed on a rear portion of a case of the headlight
    wherein the position light includes a position light case which is independently removably mounted on the headlight.

15. The front lighting apparatus structure according to claim 14,
    wherein the position light has an upper portion mounted on a headlight lower cover disposed at the lower portion of the headlight, and a lower portion mounted on a side of the headlight.

* * * * *